Nov. 5, 1929.  D. I. REITER  1,734,048
STUD SLIDE
Filed June 7, 1928
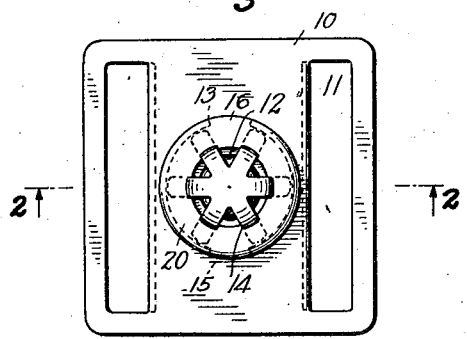
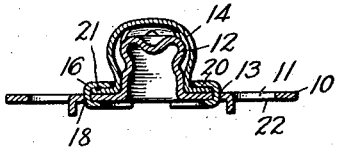
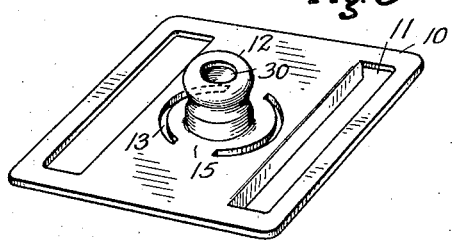
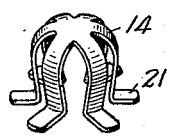
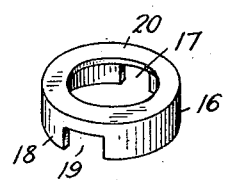
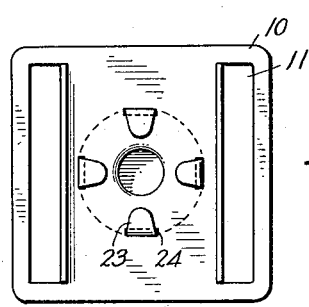
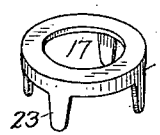
INVENTOR
Daniel I. Reiter
BY
ATTORNEY Patented Nov. 5, 1929

1,734,048

UNITED STATES PATENT OFFICE

DANIEL I. REITER, OF NEW YORK, N. Y.

STUD SLIDE

Application filed June 7, 1928. Serial No. 283,546.

This invention relates to slide fastener elements and is particularly applicable to stud slides which are designed to be movably mounted on a belt or strap, and which are usually provided with a male spring snap fastener element or stud adapted to cooperate with a suitable socket fastener element.

My invention contemplates the provision of a simple and efficient slide, adapted for manufacture in large quantities and including a minimum number of parts, whereby the cost of producing and assembling the parts may be materially reduced.

The various objects of my invention will be clear from the description which follows and from the drawings, in which, Fig. 1 is a top plan view of a preferred form of my improved slide.

Fig. 2 is a vertical section thereof, taken on the line 2—2 of Fig. 1.

Fig. 3 is a perspective view of the stud slide and of the upstanding integral stud thereon.

Fig. 4 is a similar view of the spring member or spider, adapted to be mounted on the stud and braced thereby.

Fig. 5 is a similar view of the flanged securing element or shoe for maintaining the spring fastener element in place and for securing it to the slide member.

Fig. 6 is a bottom plan view of a modified form of my improved slide, wherein the shoe is provided with a plurality of prongs.

Fig. 7 is a similar view of the modified form of shoe shown in Fig. 6, and

Fig. 8 is a vertical section of another form of my improved stud slide, wherein the spider brace or stud is made of a separate piece, and a stud holding post integral with the slide member, is provided.

In that practical embodiment of my invention which I have illustrated herein by way of example, the slide member 10 of the slide is preferably made of the usual material, being provided with elongated openings 11, through which the strap on which the slide is to be mounted may be passed. However, when a male element is to be associated with the slide member, instead of making a central perforation in the slide member 10 for the reception of a separate securing post and a separate stud, as has been customary in the past, I prefer to form the stud 12 integrally with the remainder of the slide member. Said stud may be closed at the top or may be provided with an opening as 30 as may be found convenient. In the form shown in Figs. 1 to 3 inclusive, I prefer, also, to form circularly aligned arcuate slots as 13 in the slide member 10, for the reception of the clinching projections of the shoe, as will be later described.

The spring member or spider 14 is of the usual construction, being made of spring sheet material and arranged about and substantially covering the stud 12 in such a manner as to form a spring connection with a cooperating socket of the usual type. Said spider and the socket for the reception thereof need not, therefore, be described in detail.

The acurate openings 13 in the slide member are preferably spaced from each other at the ends thereof to provide a solid portion 15 therebetween so that the material of the slide member 10 is not unduly weakened by the openings or slots. The shoe 16 may be stamped or drawn from sheet material and is provided with a central aperture as 17, through which the stud 12 and the spider 14 are passed. Downwardly projecting cylindrical extensions or flanges 18 spaced apart, extend from the shoe along the circumference of the shoe 16. Suitable openings as 19 are made between the flanges 18 for the reception of the solid portion 15 of the slide member while an inwardly extending horizontal securing flange 20, integral with and bent from the flanges 18, is made of sufficient width to engage the feet 21 of the spider for maintaining said spider or other spring element in proper position. The flanges 18 are made of sufficient height, shape and circumference to pass through the arcuate slots 13 of the slide member and to project therefrom. In order to secure the spider in place after the parts have been assembled, the projecting portion of the flanges 18 are rolled or turned over on to the under surface 22 of the slide member 10, as illustrated in Figs. 1 and 2.

In the assembling operation, the spider may first be placed over the stud 12, after which the shoe is arranged in place by passing the spider and stud through the opening 17 thereof, passing the flanges 18 through the slots 13, and clinching said flanges on to the under-surface of the slide member as above described. Or, if desired, the spider may first be passed through the opening 17 of the shoe, and the shoe together with the spider arranged over the stud, the shoe projections being passed through the slots therefor and clinched.

In the form shown in Figs. 6 and 7, the prongs 23 are substituted for the flanges 18 of the shoe, and corresponding slots 24 are made in the slide member 10, through which slots said prongs may be passed and then turned over on to the under-surface of the slide member, as above pointed out.

Referring now to Fig. 8, I have there shown an upstanding central post 25, made integral with the remainder of the slide member and replacing the usual separate post used for this purpose. In this construction, the separate stud and the spider 14 are assembled as a unit in the usual manner by means of the shoe 26, which is clinched about the feet and bottom flange of the spider and stud, respectively. The upper end 28 of the integral post 25 is spread or upset inside of the stud 27 for securing the stud unit to the slide member 10.

It will be seen that by reason of my improved construction, I have a lesser number of separate parts, with consequent saving in the cost of producing and assembling slides of the stud or socket type, while providing a strong and efficient structure, in which the parts are firmly held against displacement. I do not intend, however, to be understood as limiting myself to the specific forms of the constructions shown and described, as it will be obvious that various changes may be made therein without departing from the spirit and scope of this invention as defined by the appended claims, but intend to claim my invention as broadly as may be permitted by said claims and the state of the prior art.

I claim:

1. The combination of a slide member having a pair of spaced transverse slots therein for the passage of a belt, and having a central aperture therein formed by pressing part of the material of said slide member out of the planes of the faces of said slide member, said slide member having slots therein arranged concentrically of and about said aperture, with a spring member arranged coaxially of and about said aperture, and an annular member engaging said spring member, and provided with extensions passing through the concentrically arranged slots of said slide member and turned on to one of the faces of said slide for maintaining said spring member in place against the opposite face of the slide member.

2. A three-piece stud slide, comprising a slide member having an upstanding central post formed integral therewith, and having circularly aligned spaced slots therein spaced from the bottom of said post, a spring member arranged about and substantially covering said post and provided with extensions adapted to rest on the slide member, and a shoe having an upper flange engaging said extensions and having projections passing through said slots, said projections being clinched to the under surface of said slide member.

3. A stud slide member provided with spaced slots therein, a spring socket engaging member supported against collapse on said slide member and means for securing said spring member to one of the faces of said slide member, comprising a flanged shoe engaging said spring member and having extensions passing through said slots and turned on to the opposite face of said slide member.

4. In a stud slide including a slide member having spaced slots therein, and a braced spring member adapted to engage a socket, means for securing said spring member to said slide member comprising a shoe provided with a central aperture through which the spring member is passed and depending flanges adapted to be passed through said slots and turned over on to the furthermost face of the slide member.

5. In combination, a slide member having a pair of spaced transverse slots therein and smaller slots between the transverse slots, a portion integral with and outstanding from the slide member, a spring member for engaging a cooperating fastener element, and a centrally apertured member engaging the spring member and passing through the smaller slots and turned on to the furthermost face of the slide member for holding the spring member in place adjacent to the slide member and between the integral portion and the apertured member.

6. In a stud slide, a slide member having spaced slots therein, a yieldable stud of a separate piece of material provided with a flanged portion arranged adjacent one face of the slide member, an inner projecting member arranged inside of said stud and integral with the slide member, and means passing through the slots of the slide member and turned over on to one face of the slide member for securing the flanged portion of the unit to the slide member.

7. The combination with a substantially flat member for holding a fastener element said member having spaced circularly aligned slots therein and having a projecting portion formed by pressing out a part of said member to provide an aperture at the juncture of said portion and said member, a spring fastener element of greater diameter throughout than the projecting portion and spaced at all points thereof outwardly of said aperture and means for holding the spring fastener element in place comprising a centrally apertured shoe having projections passing through said slots and clinched to one face of the flat member and a flange holding said element in direct engagement with the other face of the flat member.

8. In a slide, a slide member having spaced transverse slots therein, and smaller circularly aligned slots arranged inwardly of the transverse slots, a spring member, and means for securing said spring member to said slide member, comprising a shoe provided with a central aperture and depending flanges on said shoe adapted to be passed through said aligned slots and turned over, part of said spring member being arranged between said shoe and the face of said slide member and held therebetween.

9. The combination with a substantially flat member for holding a fastener element in place, said member being provided with a pair of substantially rectangular spaced transverse slots arranged, respectively, near one edge of said member, and having a plurality of circularly aligned slots between said transverse slots, and said member having a projecting central portion thereon upstanding from the plane of the upper face of said flat member, of a spring member provided with a plurality of radially arranged arms, each terminating in a substantially horizontal flange, said spring member being arranged about the outside of said upstanding portion with the flanges thereof in contact with the upper face of said flat member, and a shoe having an upper flange engaging the flanges of said arms and having projections passing through said circularly aligned slots, said projections being clinched to the under face of said flat member.

10. The combination with a substantially flat member having a central aperture therein formed by pressing the central portion of said member out of the plane of the remainder of said member, and having circularly aligned slots arranged about and concentric with said aperture, of a spring fastener element of greater diameter throughout than the pressed out portion and spaced at all points thereof outwardly of said aperture and arranged concentrically of and about said aperture, and a centrally apertured shoe for holding the spring fastener element in place, said shoe having projections thereon passing through said circularly aligned slots and clinched to one face of said flat member.

DANIEL I. REITER.